US010272601B2

(12) United States Patent
Petit

(10) Patent No.: US 10,272,601 B2
(45) Date of Patent: Apr. 30, 2019

(54) APPARATUS, SYSTEM AND METHOD OF PROVIDING A SAFETY CONTAINER

(71) Applicant: NYPRO INC., Clinton, MA (US)

(72) Inventor: Robert G. Petit, Clinton, MA (US)

(73) Assignee: NYPRO INC., Clinton, MA (US)

( * ) Notice: Subject to any disclaimer, the term of this patent is extended or adjusted under 35 U.S.C. 154(b) by 0 days.

(21) Appl. No.: 14/712,603

(22) Filed: May 14, 2015

(65) Prior Publication Data

US 2016/0068317 A1 Mar. 10, 2016

Related U.S. Application Data

(60) Provisional application No. 62/047,767, filed on Sep. 9, 2014.

(51) Int. Cl.
| | |
|---|---|
| *B65D 50/06* | (2006.01) |
| *B29C 45/00* | (2006.01) |
| *B65D 50/04* | (2006.01) |
| *A61J 1/00* | (2006.01) |
| *B29L 31/00* | (2006.01) |
| *B65D 43/16* | (2006.01) |

(52) U.S. Cl.
CPC ........ *B29C 45/0081* (2013.01); *B29C 45/006* (2013.01); *B65D 50/045* (2013.01); *B65D 50/062* (2013.01); *A61J 1/00* (2013.01); *B29L 2031/7158* (2013.01); *B65D 43/162* (2013.01); *B65D 2215/04* (2013.01)

(58) Field of Classification Search
CPC .. B65D 43/162; B65D 43/169; B65D 50/045; B65D 50/062; B65D 50/065; B65D 2215/00–2215/08; B65D 50/06–50/066; B65D 2251/205; B65D 25/42
USPC .................................................. 215/201–225
See application file for complete search history.

(56) References Cited

U.S. PATENT DOCUMENTS

| | | | | | |
|---|---|---|---|---|---|
| 3,175,853 | A | * | 3/1965 | Gilbertson | B65D 50/046 206/527 |
| 3,450,290 | A | * | 6/1969 | Turner | B65D 50/062 215/206 |
| 3,482,723 | A | * | 12/1969 | Esposito, Jr. | B65D 50/065 215/221 |
| 3,581,925 | A | * | 6/1971 | Thornton | B65D 50/045 215/225 |

(Continued)

OTHER PUBLICATIONS

International Search Report and Written Opinion dated Aug. 24, 2016 for PCT/2016/032683.

(Continued)

*Primary Examiner* — Mollie Impink
(74) *Attorney, Agent, or Firm* — Cantor Colburn LLP

(57) ABSTRACT

A childproof container apparatus, system and method. The apparatus, system and method may include a container body having therewithin a cavity; a cap capable of providing access to the cavity when opened; a collar about the container body and capable of impeding access to the cap; and at least one safety feature suitable, upon actuation, to allow the collar to slide to remove the impedance to accessing the cap. The container may further include a tamper evidencing feature at least partially physically associated with the cap. The at least one safety feature may include a plurality of tabs, or one or more buttons.

11 Claims, 6 Drawing Sheets

(56) References Cited

U.S. PATENT DOCUMENTS

| | | | | | |
|---|---|---|---|---|---|
| 3,693,820 | A | * | 9/1972 | Linkletter | B65D 50/062 215/223 |
| 3,811,589 | A | * | 5/1974 | Thornton | B65D 50/04 215/225 |
| 4,043,475 | A | * | 8/1977 | Wheeler | B65D 50/061 215/206 |
| 4,260,067 | A | * | 4/1981 | Andruchiw | B65D 50/06 215/216 |
| 4,385,706 | A | * | 5/1983 | Freeman | B65D 50/06 215/223 |
| 4,467,931 | A | * | 8/1984 | Gach | B65D 55/06 215/237 |
| 4,482,068 | A | * | 11/1984 | Agbay | B65D 50/062 116/308 |
| 4,519,514 | A | * | 5/1985 | Agbay | B65D 50/06 215/218 |
| 4,632,264 | A | | 12/1986 | Evans | |
| 5,251,791 | A | | 10/1993 | Van Leer | |
| 5,348,201 | A | | 9/1994 | Koo | |
| 5,417,350 | A | * | 5/1995 | Koo | B65D 50/045 215/235 |
| 5,779,072 | A | | 7/1998 | Krebs | |
| 6,095,354 | A | * | 8/2000 | Herr | B65D 47/0842 215/225 |
| 6,371,316 | B1 | | 4/2002 | Herr et al. | |
| 7,775,402 | B2 | * | 8/2010 | Yoshida | B05B 11/3059 222/153.13 |
| 8,333,288 | B2 | * | 12/2012 | Miller | B65D 3/04 215/211 |

OTHER PUBLICATIONS

International Preliminary Report on Patentability and Written Opinion, dated Nov. 14, 2017, for International Patent ApplicationPCT/US2016/032683.

* cited by examiner

APPARATUS, SYSTEM AND METHOD OF PROVIDING A SAFETY CONTAINER

CROSS-REFERENCE TO RELATED APPLICATIONS

This application claims the benefit of priority to U.S. Provisional Application No. 62/047,767, entitled "CONTAINER," which was filed on Sep. 9, 2014, the entire disclosure of which is incorporated by reference as if set forth herein in its entirety.

BACKGROUND

Field of the Disclosure

The disclosure is directed generally to containers, and, more specifically is directed to an apparatus, system and method of providing a childproof, and/or tamper evident, safety container.

Background of the Disclosure

Childproof and similar safety containers, container caps, and the like, are well known. In a typical embodiment, the childproof container comprises a container portion, i.e., a bottle into which pills, liquid, medication, powder, of the like are placed, and a cap, or lid, that sits substantially atop the bottle. The "childproof" aspects of these container caps typically include: the requirement to press the cap of the container down, with appreciable pressure, while also turning the cap with one hand, and holding the container with the other hand, in order to remove the cap; or the need to press the sides of the container cap in, from both sides, in a high-pressure "pinch" with one hand, while also turning with that hand and holding the container with the other hand.

These childproof aspects thus share two common elements—namely, the need to apply significant pressure, either in a pinching motion, or in a push down and twist motion, and the need to use two hands (one to actuate the cap, and one to hold the container) that results from the need to apply the significant pressure to actuate the cap. Unfortunately, these requirements not only limit a child's ability to open the container, they often limit an adult's ability to open the container.

More specifically, adults engaged in any activity in addition to opening the container may be unable to continue with that additional activity due to the need to use two hands to open the container. Additionally, any adult for whom using one or both hands is difficult is also limited in the ability to open the container. For example, elderly persons, who often are patients who need to open medicinal containers, may have difficulty applying the requisite pressure to open a childproof container, or may suffer from arthritis that is more severe in one hand than in the other, thereby limiting the ability to use both hands.

Therefore, the need exists for a method of "childproofing" a container that allows the container to be readily opened by adults, even if those adults cannot use both hands or cannot apply significant pressure to the container in efforts to open the container.

SUMMARY OF THE DISCLOSURE

The disclosure includes at least a childproof container apparatus, system and method. The apparatus, system and method may include a container body having therewithin a cavity; a cap capable of providing access to the cavity when opened; a collar about the container body and capable of impeding access to the cap; and at least one safety feature suitable, upon actuation, to allow the collar to slide to remove the impedance to accessing the cap. The container may further include a tamper evidencing feature at least partially physically associated with the cap. The at least one safety feature may include a plurality of tabs, or one or more buttons.

The method of forming a child-proof container may particularly include the steps of molding at least a container body, an integral flip top cap, and a hinge between the container body and the flip top cap; forming one or more safety features for physical association with the container body; molding a collar for integration with the one or more safety features; and sliding the molded collar over the integral flip top cap so that the flip top cap may not be actuated absent actuation of the one or more safety features to allow for movement of the collar away from at least a portion of the flip top cap.

Accordingly, the present disclosure provides at least childproof and/or tamper evident containers.

BRIEF DESCRIPTION OF THE FIGURES

In the following description, reference is made to the accompanying figures. These figures are described in sufficient detail to enable those skilled in the art to practice the disclosed exemplary embodiments. In the figures, like numerals represent like elements, and.

DETAILED DESCRIPTION OF THE EMBODIMENTS

Figure 1A:
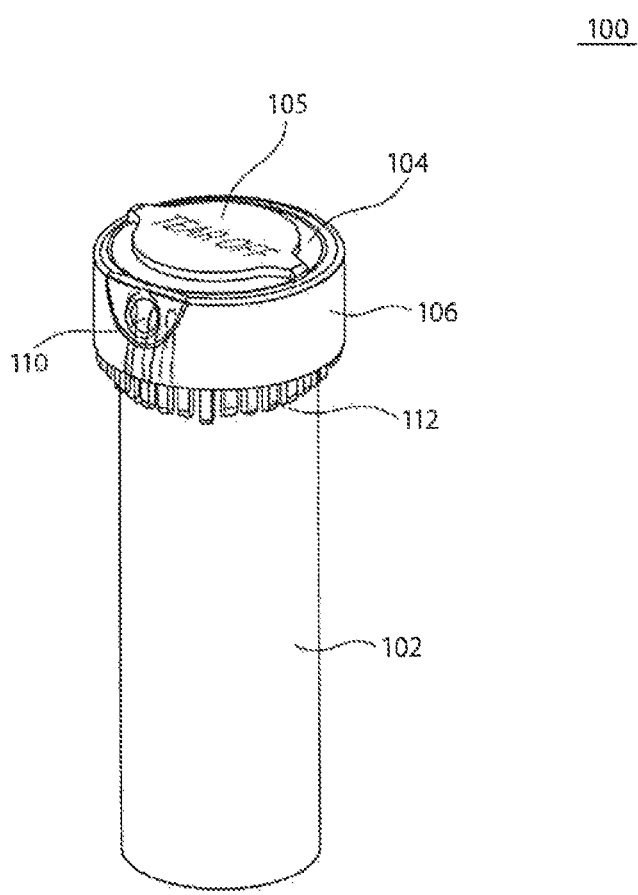
FIG. 1A shows a container according to an embodiment of the disclosure.

It is to be understood that the figures and descriptions of the present disclosure have been simplified to illustrate elements that are relevant for a clear understanding of the disclosed exemplary embodiments, while eliminating, for the purpose of clarity, many other elements found in typical similar apparatuses, systems, and processes. Those of ordinary skill in the art may thus recognize that other elements and/or steps are desirable and/or required in implementing the examples of the present disclosure. However, because such elements and steps are well known in the art, and because they do not facilitate a better understanding of the disclosure, a discussion of such elements and steps is not provided herein. The disclosure herein is nevertheless directed to all such variations and modifications to such elements and methods known to those skilled in the art.

In exemplary embodiments of the disclosure, a collar may be present around a molded container, such as having a flip cap, twist off cap, tear off cap, or like cap or lid (also collectively referred to herein as "flip top cap"). By way of non-limiting example, the flip top cap may form, with the container, a single molded part, wherein the flip top cap has a molded hinge that connects it to the body of the container. Accordingly, when in its raised position, the collar may prevent flipping upward of the flip top cap, which thereby prevents opening of the container to reveal the contents of a cavity therewithin.

Various aspects may impede sliding of the collar, and thus provide "safety features" that prevent access to the cavity within the container. For example, teeth, or "tabs", may be resident on or inserted into or through the body of the container, such that only when certain tabs are depressed proximate to the collar may the collar be slid downward. For example, a plurality of tabs may be inserted during manufacture through a plurality of "windows" in the container sized to receive the tabs, and may be located so as to place at least a portion of the tabs beneath the collar, with at least a portion of the tabs exposed from below the collar to allow for eventual actuation. Moreover, the tabs may evidence tampering, at least in that the tabs may not be removed without destruction of the bottle.

Likewise, a button or buttons, which may be integral with, or inserted through, the collar, may require depressing prior to sliding the collar. Yet further, the button or buttons may engage the container body, or the tabs. Additionally, multiple such aspects to impede sliding of the collar may require actuation before the collar may slide.

In light of the foregoing, for example, children are naturally most likely to attempt to pull the collar upward to open the container. Similarly, a child may have no understanding of the need to depress or otherwise actuate the safety features that allow for movement of the collar, which thereby precludes the child from opening the container to access the contents within the cavity of the container.

Figure 1B:
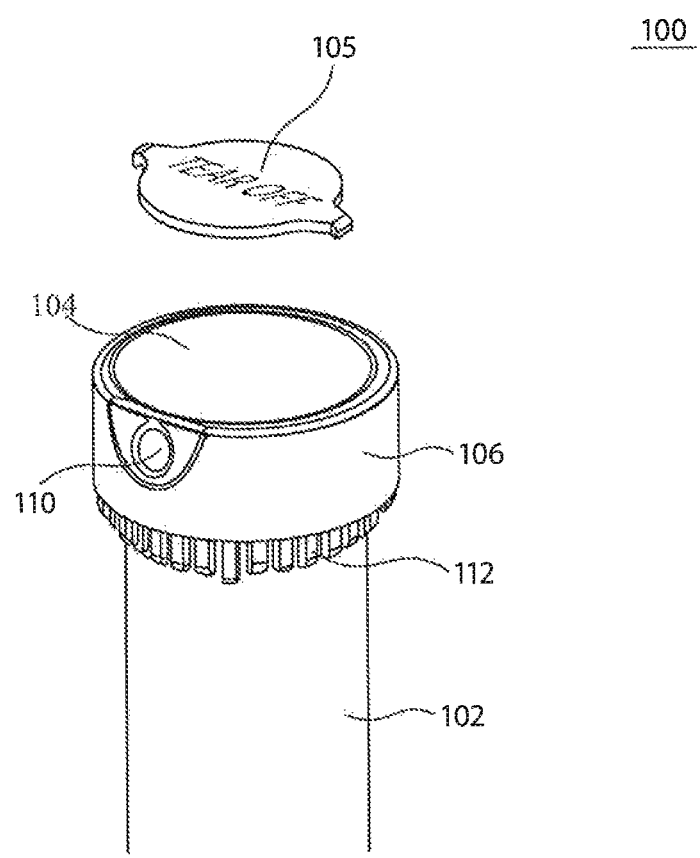
FIG. 1B shows a container according to an embodiment of the disclosure.

Referring now to FIGS. 1A and 1B, according to exemplary embodiments a product package, i.e., a container 100, may include an interior cavity for containing a product (not shown), such as medicine. An exemplary container may include a tear off covering as its flip top cap, such as in the form of top covering. The top covering may be proximate to an opening for accessing the interior cavity. The top covering may provide for tamper evidencing, for example.

As illustrated in the diagram of FIG. 1A, the container 100 may include a body 102 having a flip top cap 104. Also included in association with cap 104 may be tamper evidencing aspects, such as tear off tamper evidence feature 105. Removal of tamper feature 105 may indicate that the container contents have been subjected to tampering. Of course, other types of tamper evidencing feature 105 may be included in association with cap 104, such as a tear away plastic envelope, a tamper evidencing sticker across the cap and/or contacting the inner or outer portion of the collar 106.

By way of non-limiting example and in alternative exemplary embodiments, a tearable covering may be proximate to and/or placed about, and dimensioned and otherwise configured to evidence an initial opening of, the flip-top cap 104. That is, a tearable covering may evidence potential tampering with contents in the container cavity.

With reference now also to FIG. 1B, about the body 102 and proximate to the cap 104 may be collar 106. In an exemplary embodiment, the cap 104 may not be accessible to be opened until the collar 106 is slid downward past the edges from which the cap 104 is actuated.

The collar 106 may include an at least partially integrated button 110 that is actuated to allow the collar 106 to slide downward away from cap 104. Of course, those skilled in the pertinent arts will appreciate that multiple such buttons, such as on opposing sides of the circumference of collar 106, may be included. Similarly, although the illustrated button 110 is shown at least partially integral with, and at the upper portion of, collar 106, it will be understood in light of the disclosure that the button 110 need not be integral with the collar 106, and may be located at a different portion or portions of collar 106.

Also shown in FIGS. 1A and 1B is a plurality of tabs 112 that partially extend below the collar 106 along the body 102 below the circumference of the collar 106. As discussed above with respect to button 110, collar 106 may be prevented from sliding downward along body 102 unless particular ones of tabs 112 are actuated, such as by pressing the exposed lower portion of tabs 112, and/or by pressing button 110 into tabs 112. The button(s), tabs, and like elements that herein impede movement of the collar to expose the cap 104 are also collectively referred to as "safety features."

Figure 2:
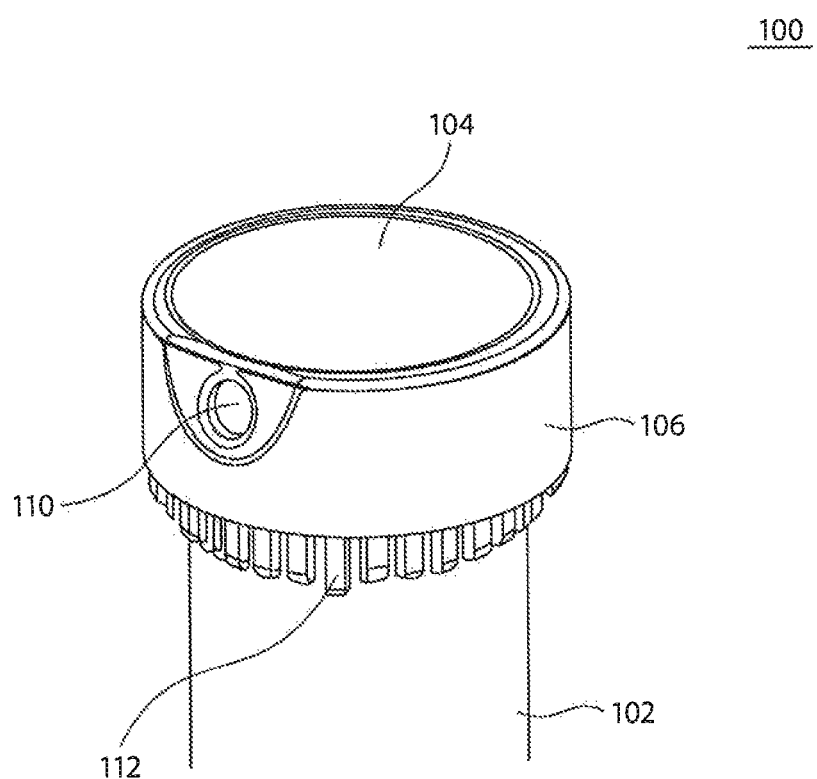
FIG. 2 shows a container according to an embodiment of the disclosure.
Figure 3:
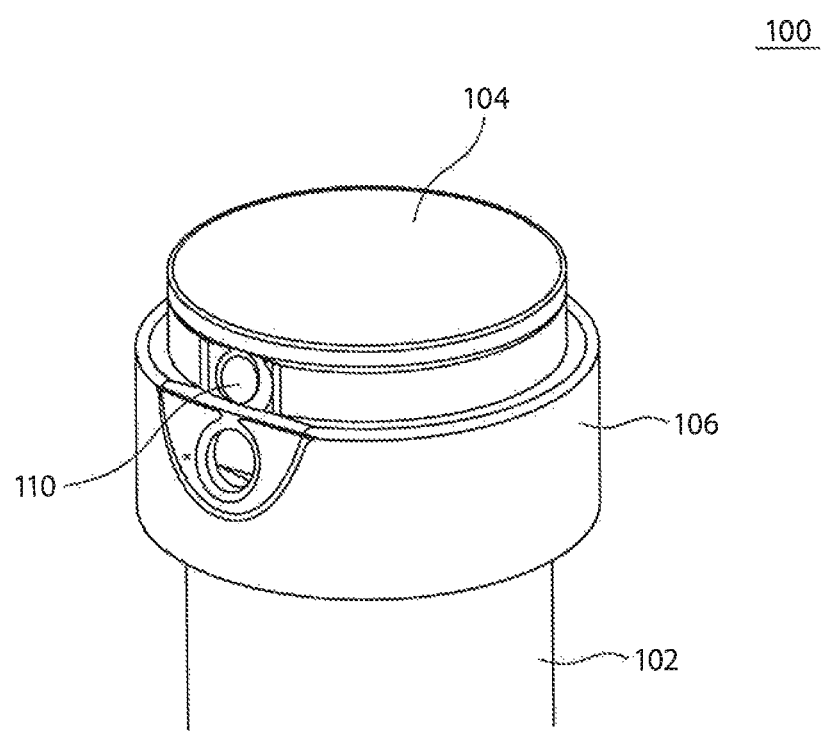
FIG. 3 shows a container according to an embodiment of the disclosure.

Referring now also to FIGS. 2 and 3, the container 100 may be opened to expose the contents within the cavity thereof by actuating, such as by pressing, a deflectable, deformable and/or movable interface, such as button 110 and/or tabs 112. Thus, the interface may, for example, take the form of one or more of tabs 112, and/or one or more of button 110. In exemplary embodiments, the interface works in conjunction with the slideable collar 106 to allow exposure of cap 104 for opening thereof. The collar 106 may be slid downward, for example, as shown in FIG. 3.

In the illustrated exemplary embodiments, the collar 106 has a shape that may be substantially similar to that of the container. By way of non-limiting example, the collar is dimensioned, sized, and shaped so as to slideably engage the container, such as being round and having an inner and an outer portion, wherein the inner portion of collar 106 engages with at least portions of the outer portion of body 102 of container 100. The collar 106 may physically incorporate with the illustrated deflectable button 110 to allow sliding downward of collar 106. More particularly, button 110 may or may not be integrally formed with the collar 106.

As referenced, the container 100 includes an orifice leading to a cavity. In the illustrated embodiments, the orifice may be of a shape similar to that of the collar deflectable button. The orifice may be positioned to have at least a portion thereof substantially engage the button 110 when the button 110 is not user-deflected. When the orifice engages the button 110, sliding of the collar 106 relative to the container body 102 may be prevented or restricted, for example.

Figure 4:
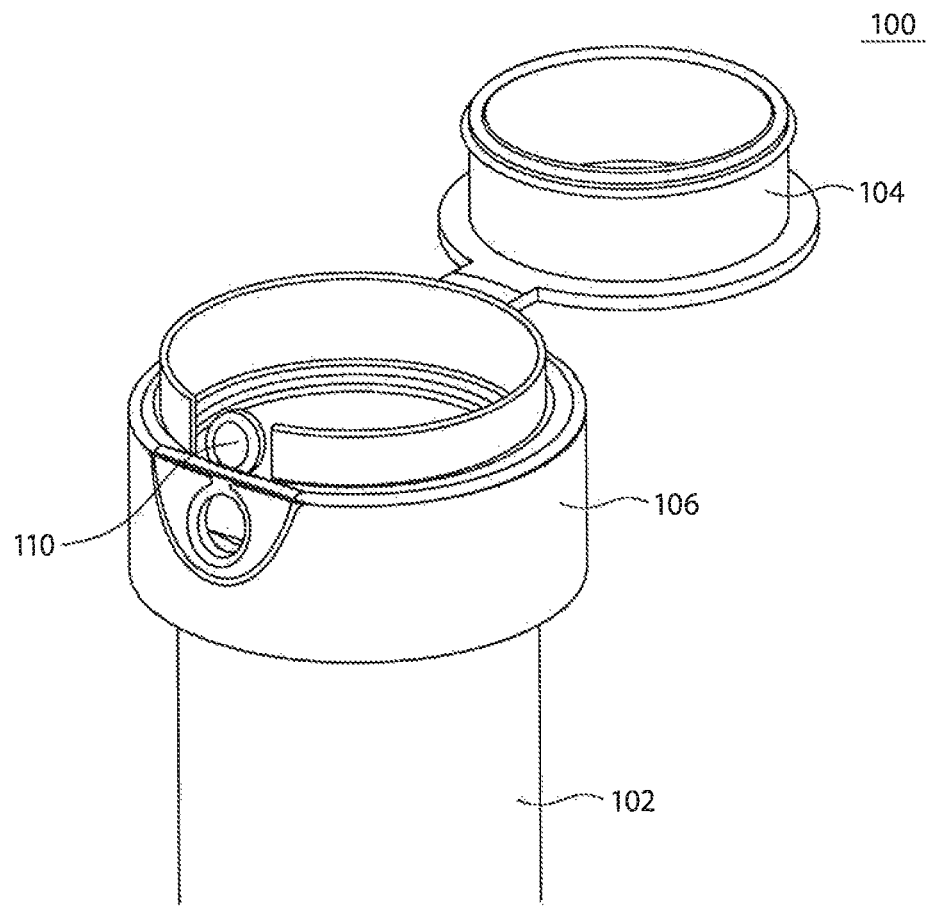
FIG. 4 shows a container according to an embodiment of the disclosure.

Referring now also to FIG. 4, once the button 110 and/or tabs 112 are deflected, pressed, deformed, or the like, the collar 106 may slide downward and the flip-top cap 104 proximate the container orifice may be flipped upward, providing access to the container interior/cavity. In the exemplary embodiments, the flip-top cap 104 may take the form of any flip-top lid, closure, or the like.

As discussed throughout, the flip-top cap 104 may be exposed to user action (e.g., opening), such as by sliding the collar 106. In exemplary embodiments, the lid thus exposed may be flipped open using a finger to lift the lid just above the collar button 110, as is evident in the example of FIG. 4. Different operational sequences may be used to close the container 100, such that closing the lid/cap 104, and/or moving the collar 106 back into its home position, may occur in any order.

Figure 5:
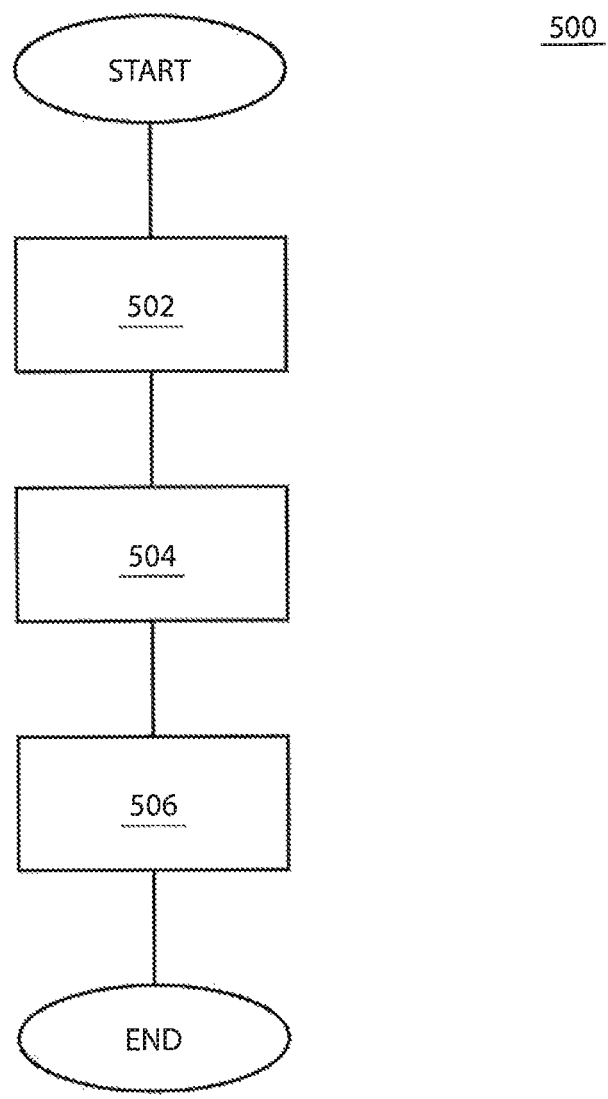
FIG. 5 illustrates an exemplary method of forming a container according to an embodiment of the disclosure.

FIG. 5 illustrates an exemplary method 500 of providing the discussed container. As referenced herein, at step 502 the container body, and, in optional embodiments, the flip top cap, the hinge between the container body and the flip top cap, and/or one or more of the buttons, may be formed, such as, for example, using injection molding. In a similar manner, the collar may formed, such as by injection molding, at step 502. At step 504, the tabs discussed herein may be formed and physically associated with the container. Thereafter, the collar may simply slide over the top of the container, at step 506, for subsequent actuation. By way of non-limiting example, in embodiments wherein aspects are formed by injection molding, such aspects may be formed of propylene/polyethylene.

Although the disclosure has been described in detail for the purpose of illustration, it is to be understood that such detail is solely for that purpose and that variations may be made therein by those skilled in the art without departing from the spirit and scope of the disclosed exemplary embodiments.

What is claimed is:

1. A childproof container, comprising:
a container body having therewithin a cavity;
a flip cap capable of providing access to the cavity when opened, wherein a flip portion of the flip cap has a perimeter that is less than an outer perimeter of a topmost aspect of the flip cap;
a collar having an inner circumference about the container body and capable of impeding opening of the flip cap until a downward sliding of the collar at least by abutting impeding portions of a plurality of undepressed tabs integral with and extending through the container body;
the plurality of undepressed tabs exposing at least aspects of the impeding portions to a user to allow for depression thereof, and having upper portions that impede free movement of the collar absent depression of the impeding portions and which are covered by the collar absent depression; and
at least one safety feature physically associated with the container body and with the inner circumference and suitable, upon depression, to allow the collar to slide away from the flip cap along the container body to allow opening of the flip cap, wherein the at least one safety feature remains physically associated with the inner circumference during and following the depression.

2. The container of claim 1, wherein the container body is injection molded.

3. The container of claim 1, wherein the flip top cap comprises a hinge capable of physically connecting the flip top cap to the container body.

4. The container of claim 3, wherein the flip top cap, hinge, and the container body comprise a single injection molding.

5. The container of claim 1, further comprising a tamper evidencing feature at least partially physically associated with the flip cap.

6. The container of claim 5, wherein the tamper evidencing feature comprises a tear off tab.

7. The container of claim 1, wherein the flip cap comprises a tear off tab.

8. The container of claim 1, wherein the at least one safety feature is at least one button passing through the collar enables depression of at least ones of the upper portions of the plurality of undepressed tabs.

9. The container of claim 1, wherein the cavity contains medication.

10. The container of claim 1, wherein the safety feature is at least one of deflectable and deformable.

11. The container of claim 1, wherein closure of the flip cap and an inverse slide of the collar reseals the cavity.

\* \* \* \* \*